United States Patent [19]
Yao

[11] Patent Number: 5,917,179
[45] Date of Patent: Jun. 29, 1999

[54] BRILLOUIN OPTO-ELECTRONIC OSCILLATORS

[75] Inventor: X. Steve Yao, Diamond Bar, Calif.

[73] Assignee: California Institute of Technology, Pasadena, Calif.

[21] Appl. No.: 09/010,417

[22] Filed: Jan. 21, 1998

Related U.S. Application Data

[60] Provisional application No. 60/046,248, May 12, 1997.

[51] Int. Cl.$^6$ .............................. G02F 1/035; H01S 3/098
[52] U.S. Cl. ..................... 250/227.11; 250/205; 359/181; 359/187; 359/245; 372/12; 372/18
[58] Field of Search ......................... 250/227.11, 227.12, 250/227.17, 227.18, 227.21, 205, 214.1, 214 R; 372/12, 18; 385/2, 3, 8; 359/245, 246, 254, 259, 315, 316, 317, 318, 319, 320, 181, 184, 187, 192, 195

[56] References Cited

U.S. PATENT DOCUMENTS

| | | |
|---|---|---|
| 3,569,715 | 3/1971 | Horning .................................. 359/161 |
| 4,700,150 | 10/1987 | Hall et al. ................................. 359/279 |
| 5,126,876 | 6/1992 | O'Meara .................................. 359/338 |
| 5,200,964 | 4/1993 | Huber ......................................... 372/26 |
| 5,343,324 | 8/1994 | Le et al. .................................. 359/184 |
| 5,379,309 | 1/1995 | Logan, Jr. ................................ 372/18 |
| 5,400,417 | 3/1995 | Allie et al. ................................ 385/12 |
| 5,495,359 | 2/1996 | Gertel et al. ............................ 359/245 |
| 5,532,857 | 7/1996 | Gertel et al. ............................ 359/154 |
| 5,654,818 | 8/1997 | Yao ........................................ 359/246 |
| 5,723,856 | 3/1998 | Yao et al. .......................... 250/227.11 |
| 5,777,778 | 7/1998 | Yao ........................................ 359/245 |
| 5,796,510 | 8/1998 | Yao ........................................ 359/256 |

*Primary Examiner*—Edward P. Westin
*Assistant Examiner*—John R. Lee
*Attorney, Agent, or Firm*—Fish & Richardson P.C.

[57] ABSTRACT

Opto-electronic oscillators having at least one Brillouin feedback loop based on the Brillouin selective sideband amplification to provide a sufficient gain for the oscillator to start and sustain an electro-optic oscillation. Such an oscillator can generate high frequency, high spectral purity, and tunable microwave signals in both optical and electrical domains.

82 Claims, 10 Drawing Sheets

BRILLOUIN OPTO-ELECTRONIC OSCILLATORS

This application claims the benefit of the U.S. Provisional Application No. 60/046,248, filed on May 12, 1997, which is incorporated by reference.

ORIGIN OF THE INVENTION

This invention was made in the performance of work under a NASA contract, and is subject to the provisions of Public Law 96-517 (35 U.S.C. 202) in which the Contractor has elected to retain title.

FIELD OF THE INVENTION

The invention relates to signal processing and modulation in opto-electronic devices and systems, and more specifically, to electro-optic oscillators.

BACKGROUND OF THE INVENTION

Opto-electronic systems may implement one or more feedback loops to achieve certain operational characteristics. For example, a single-frequency laser can use a passive feedback loop to correct drifts in the laser frequency to achieve a stabilized output frequency. A typical feedback loop of this type includes a photosensor to convert a fraction of the laser output into an electrical signal and a frequency reference device to generate a benchmark frequency to which the laser frequency is locked. A non-zero error signal indicative of the frequency difference between the laser frequency and the benchmark frequency is generated by the feedback loop. The error signal is used to actively maintain the laser frequency near or at the benchmark frequency. A regeneratively mode-locked laser is another example of an opto-electronic system with a passive feedback loop in which a mode beat signal from a laser is detected by a photodetector in the feedback loop. The signal from the photodetector is subsequently amplified and fed back to modulate the laser.

In addition to passive feedback loops, an active opto-electronic feedback loop may also be used in an opto-electronic system. An active feedback loop not only can provide a feedback to alter the operation of the system but also can generate and sustain an electromagnetic oscillation in the loop. Photonic oscillators can be formed by using one or more active opto-electronic feedback loops to generate radio frequency (RF) oscillations.

RF oscillators are widely used for generating, tracking, cleaning, amplifying, and distributing RF carriers and can have important applications in communication, broadcasting, and receiving systems in the radio frequency spectral range. In particular, voltage-controlled RF oscillators with phase-locked loops are used for clock recovery, carrier recovery, signal modulation and demodulation, and frequency synthesizing.

Photonic components and devices can be used to construct RF oscillators. Unlike conventional RF devices and other electronic devices which transfer information by flow of electrons, photonic technology uses photons to transfer information. In particular, photonic technology offers a number of advantages including: low loss, light weight, high carrier frequency, high security, remote capability, and immunity to electromagnetic interference.

Rapid advances in photonic fields including diode laser systems, photodetectors, electro-optical light modulators, and optical fiber systems allow implementation of photonic technology in traditional RF systems for many applications, with enhanced performance. This trend presents significant advantages for photonic RF systems and greatly expands the horizon of photonic applications. For example, optical waves may be used as a carrier to transport the information contained in RF signals through optical fibers to remote locations in a photonic RF system. This also allows some of the RF signal processing functions such as signal mixing, antenna beam steering, and signal filtering, to be accomplished optically.

One implementation of the photonic RF oscillator is an opto-electronic oscillator ("OEO") which has one or multiple active feedback loops to generate both optical modulation and electrical oscillation in radio frequency spectrum. An OEO usually has an electro-optic modulator pumped by a laser and at least one active opto-electronic feedback loop which provides in-phase feedback to an RF input port of an electro-optic light modulator. For an OEO with a single opto-electronic feedback, the open loop gain in the loop should be greater than unity in order to generate an RF electrical oscillation. The pump laser is usually a single-mode laser. The continuous photon energy from the laser is converted into RF or microwave signals by the feedback loop.

The feedback loop in an OEO can be electrical and/or optical, allowing both signal output and signal injection in either electrical or optical format or a combination thereof. An OEO can be used to produce spectrally pure RF oscillations with excellent stability, frequency tunability and low phase noise. The high performance and adaptability for both optical and electrical domain make OEOs suitable to a variety of applications for photonic communication and data processing systems. Detailed information on opto-electronic oscillators can be found, for example, in U.S. patent application Ser. No. 08/510,064, now U.S. Pat. No. 5,723,856, for a single-loop OEO by Yao and Maleki, and U.S. patent application Ser. No. 08/693,798, now U.S. Pat. No. 5,777,778, for a multiple-loop OEO by Yao.

Another type of opto-electronic oscillator suitable for generating RF oscillations is a coupled opto-electronic oscillator ("COEO"). This device directly couples a laser oscillation in an optical feedback loop to an electrical oscillation in an opto-electronic feedback loop. The laser oscillation and the electrical oscillation are intimately correlated with each other so that both the modes and stability of one oscillation are coupled with another oscillation. The optical feedback loop has a gain medium and a loop gain greater than unity to effect the laser oscillation. The coupling between two feedback loops is achieved by controlling the loop gain of the optical loop by an electrical signal generated by the opto-electronic feedback loop.

One advantage of the COEO is that a single-mode RF oscillation can be achieved without a RF bandpass filter or additional feedback loops. Another advantage is that a multi-mode laser can be used. In addition, such a coupled OEO can be used to produce ultrashort pulses. See, U.S. patent application Ser. No. 08/937,892, entitled "COUPLED OPTO-ELECTRONIC OSCILLATOR", filed on Sep. 25, 1997 by Yao.

SUMMARY OF THE INVENTION

The present invention relates to opto-electronic oscillators with an active feedback loop that generates an electrical modulation signal based on the stimulated Brillouin scattering in an optical medium disposed in the feedback loop. Since the Brillouin scattering forms the basis for the active feedback and the oscillation, the devices disclosed herein are generally referred as "Brillouin Opto-Electronic Oscillators" or "Brillouin OEOs".

A Brillouin OEO includes at least one opto-electronic feedback loop which has a Brillouin optical medium. An optical pump laser beam is injected into the Brillouin optical medium to produce an acoustic grating moving in the direction of the pump laser beam due to the electrorestrictive effect. The grating interacts with the pump laser beam to produce a backscattered optical wave known as the Brillouin scattering signal. The frequency of the Brillouin scattering signal is less than that of the pump laser beam due to the Doppler effect. The Brillouin scattering signal is converted into an electrical modulation signal by a photodetector in the opto-electronic feedback loop. The loop gain of the opto-electronic feedback is preferably greater than unity by the Brillouin amplification. Thus, an electromagnetic oscillation can be generated in the opto-electronic feedback loop.

One embodiment of the invention comprises a first laser to produce a signal beam, an optical modulator which modulates the signal beam in response to an electrical modulation signal, an opto-electronic feedback loop which receives a portion of the modulated signal beam from the modulator and has a Brillouin optical medium, and a second laser coupled to the Brillouin optical medium and operable to generate a Brillouin pump beam in the opposite direction of the signal beam in the Brillouin optical medium. The opto-electronic feedback loop further includes a photodetector which converts the beat between the signal beam and the Brillouin signal produced by the Brillouin pump beam into the electrical modulation signal. A Brillouin OEO in accordance with this embodiment produces an oscillation in the opto-electronic feedback loop at the beat frequency between the frequency of the Brillouin signal and the frequency of the signal laser. By adjusting either the frequency of the first or the second laser, the oscillation frequency may be tuned to a desired frequency.

Another embodiment of the invention comprises a single pump laser to produce both a signal beam and a pump beam at the same frequency, an optical modulator which modulates only the signal beam in response to an electrical modulation signal, an opto-electronic feedback loop which receives a portion of the modulated signal beam from the modulator and has a Brillouin optical medium, and an optical coupler to couple the pump beam into Brillouin optical medium in the opposite direction of the signal beam. The opto-electronic feedback loop further includes a photodetector which converts the beat between the signal beam and the Brillouin signal produced by the pump beam into the electrical modulation signal. The feedback of the opto-electronic loop causes an electromagnetic oscillation at an oscillating frequency equal to the frequency shift of the Brillouin signal relative to the pump beam, i.e., $2nu_a/\lambda_p$. The frequency of the pump laser may be adjusted to tune the oscillating frequency.

Further, one or more auxiliary feedback loops may be implemented in addition to a Brillouin opto-electronic feedback loop to form a multi-loop Brillouin OEO. An auxiliary feedback loop may be of any type, including an electrical feedback loop, an optical loop, a non-Brillouin opto-electronic loop, or another Brillouin opto-electronic loop. Each loop may have an open loop gain smaller than unity and is still capable of sustaining an oscillation as long as the total open loop gain of all loops is greater than unity.

The Brillouin optical medium and other optical routing elements may be made of optic fiber. Therefore, a Brillouin OEO can be integrated into a fiber optical communication system or data processing system.

The opto-electronic feedback loop having a Brillouin medium in a Brillouin OEO may sustain a single-mode oscillation without an electronic frequency filter. This is because the Brillouin signal inherently has a narrow bandwidth on the order of tens of MHZ in many materials and therefore the Brillouin scattering process can effectively force the oscillation into a single mode. In addition, electrical amplification may also be eliminated due to the Brillouin amplification.

These and other features and advantages of the present invention will become more apparent in light of the following detailed description of preferred embodiments, the accompanying drawings, and the appended claims.

DETAILED DESCRIPTION OF THE INVENTION

Brillouin Selective Sideband Amplification

Figure 1A:
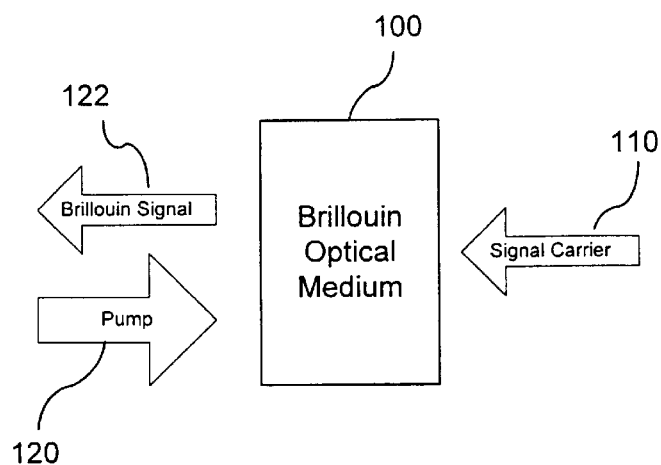
FIG. 1A is a diagram showing a typical optical configuration in a Brillouin scattering process.

Brillouin Scattering is a known optical effect. When an acoustic wave causes variations of the density of an optical medium, an optical grating is produced to cause scattering of an electromagnetic wave traveling in that optical medium. The wavelength of the scattered electromagnetic wave in the Brillouin scattering is shifted with respect to that of the original electromagnetic wave due to the Doppler effect by the motion of the acoustic wave.

Energy is exchanged in the Brillouin scattering between the optical medium and the electromagnetic wave. Depending on the relative directions of the acoustic wave and the electromagnetic wave, the frequency of the scattered electromagnetic wave may be shifted to a lower frequency (i.e., "Stokes shift") or a higher frequency (i.e., "anti-Stokes shift").

Stimulated Brillouin scattering ("SBS") is a nonlinear optical effect which occurs when a coherent electromagnetic wave with an intensity above a certain threshold level is used as a pump in a Brillouin scattering process. See, for example, A. Yariv, Chapter 18, Quantum Electronics, 2nd ed., 1975 (John Wiley & Sons). The nonlinear interaction of the optical medium and the coherent optical pump wave at a frequency $v_p$ generates an acoustic wave due to the electrorestrictive effect. This acoustic wave forms a moving acoustic grating in the medium which moves in the same direction of the optical pump wave. The grating scatters the pump wave.

In general, multiple scattered waves are generated by the grating. However, due to the phase-matching restraints, the strongest scattered wave is the backscattered wave which propagates in the opposite direction of the pump wave. Thus, the frequency $v_B$ of the backscattered optical wave from the acoustic grating is down-shifted relative to the pump wave frequency $v_p$ by $v_D = 2nu_a/\lambda_p$ due to the Doppler effect, where $u_a$ is the velocity of the acoustic wave in the medium, n is the refractive index of the medium, and $\lambda_p$ is the wavelength of the optical pump wave. The remainder of the input pump wave transmits through the medium.

When the input optical power exceeds the SBS threshold, a significant portion of the input power is transferred into the back scattered optical wave. This results in a saturation behavior in the transmitted wave, i.e., the power of the transmitted wave will no longer increase linearly with the input power. The SBS threshold is known to be linearly proportional to the spectral linewidth of the optical pump wave. Therefore, an optical pump wave with a narrow linewidth can be used to reduce the SBS threshold. For example, in many commercial silica fibers, a SBS threshold of several milliwatts may be achieved by using a pump wave at about 1.3 µm.

When a narrow-band seed signal in the opposite direction of the pump wave with the same frequency of the back scattered wave at $v_B = (v_p - v_D)$ is injected into an optical medium, the interaction between the seed signal and the pump wave can significantly enhance the acoustic grating initially induced by the pump wave. This effect, in turn, increases the back scattering of the pump wave into the seed signal and thereby effectively amplifies the seed signal. Therefore, the influence of the seed signal converts the spontaneous Brillouin scattering into a stimulated Brillouin scattering, at a pump power much below the SBS threshold. The stimulated back scattering light adds up in phase with the seed signal. This process is known as Brillouin amplification. See, for example, G. P. Agrawal, *Nonlinear Fiber Optics,* Academic Press, San Diego (1989), Chapter 9.

The Brillouin amplification can be used to implement a signal amplification scheme to selectively amplify a sideband in a modulated optical signal. The narrow bandwidth of the Brillouin amplification is used to selectively amplify one or more desired sidebands and to leave the strong carrier signal essentially unchanged. This process can be called Brillouin selective sideband amplification ("BSSA"). Many useful opto-electronic devices can be formed based on the Brillouin selective sideband amplification. The details of the Brillouin selective sideband amplification can be found in U.S. patent application Ser. No. 08/006,845, entitled "OPTO-ELECTRONIC DEVICES AND SYSTEMS BASED ON BRILLOUIN SELECTIVE SIDEBAND AMPLIFICATION", filed on Jan. 14, 1998 by Yao, which is incorporated herein by reference.

Figure 1B:
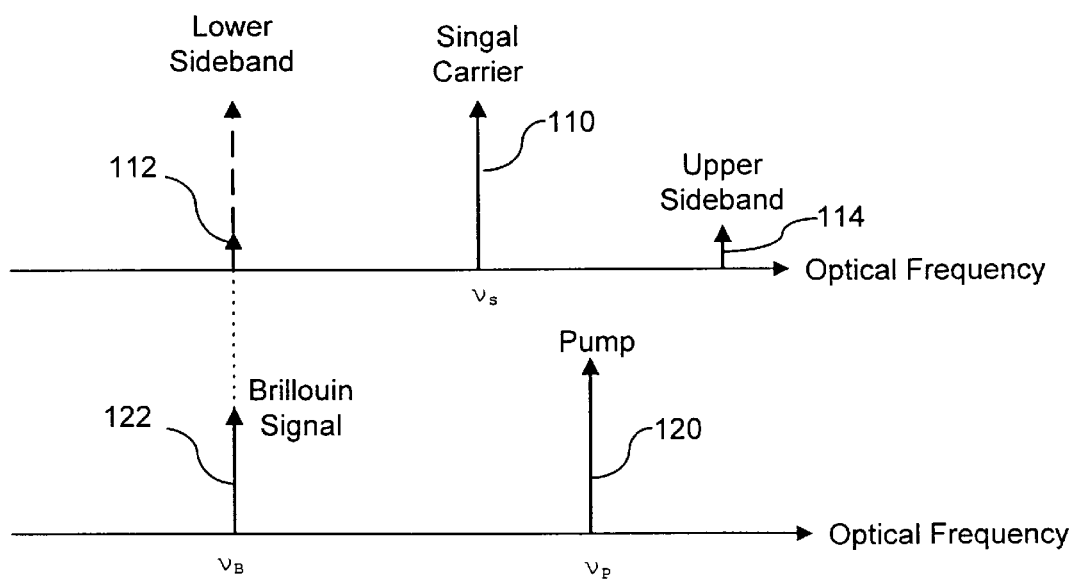
FIG. 1B is a spectrum diagram showing the frequencies of a pump signal, the down-shifted Brillouin scattering signal, a carrier signal and sidebands wherein a lower sideband is amplified.

The Brillouin selective sideband amplification is illustrated in FIGS. 1A and 1B. FIG. 1A shows the optical configuration of a Brillouin scattering device. A pump beam 120 and a signal carrier 110 are injected to a Brillouin optical medium 100 in opposite directions. A Brillouin signal 122 is generated by scattering of the pump beam 120 within the optical medium 100. FIG. 1B shows exemplary optical spectra of the system in FIG. 1A wherein the Brillouin signal overlaps a lower sideband 112 of the signal 110. The carrier signal 110 at a carrier signal frequency $v_s$ has two sidebands 112 and 114 located on each side which are produced by modulation of the carrier signal 110. An RF modulation scheme is typically used in modulating the carrier signal 110, which may have a modulation frequency ranging from the radio frequencies to millimeter wave frequencies. According to the invention, the BSSA process can be used to select the lower sideband signal 112 for amplification by overlapping the Doppler-shifted backscattered Brillouin wave 122 with the lower sideband signal 112. FIG. 1A further shows that the backscattered Brillouin wave 122 at $v_B$ produced by scattering of the pump wave 120 at $v_p$ in the optical medium 100 is tuned to overlap with the lower sideband 112. The energy of the pump beam 120 is transferred into the lower sideband signal 112 by coupling between the backscattered Brillouin wave 122 and the lower sideband signal 112. Such a scheme is efficient because essentially all Brillouin scattering energy from the pump laser goes into the desired weak sideband 112. Furthermore, because the strong carrier 110 is not amplified, the saturation of a receiving photodetector can be avoided.

The above-described Brillouin selective sideband amplification can be used to construct an active feedback loop in an opto-electronic oscillator. In particular, an all-optical opto-electronic oscillator can be formed by using the Brillouin selective sideband amplification technique to provide a sufficient gain for the oscillator to initiate and sustain an electro-optic oscillation. Such an oscillator can generate high spectral purity and tunable microwave signals in both optical and electrical domains at high frequencies, for example, beyond 100 GHz. In addition, an electro-optic phase modulator rather than an amplitude modulator to obviate the bias drift problem commonly found in amplitude modulators.

Single-Loop Brillouin Opto-Electronic Oscillators

Figure 2:
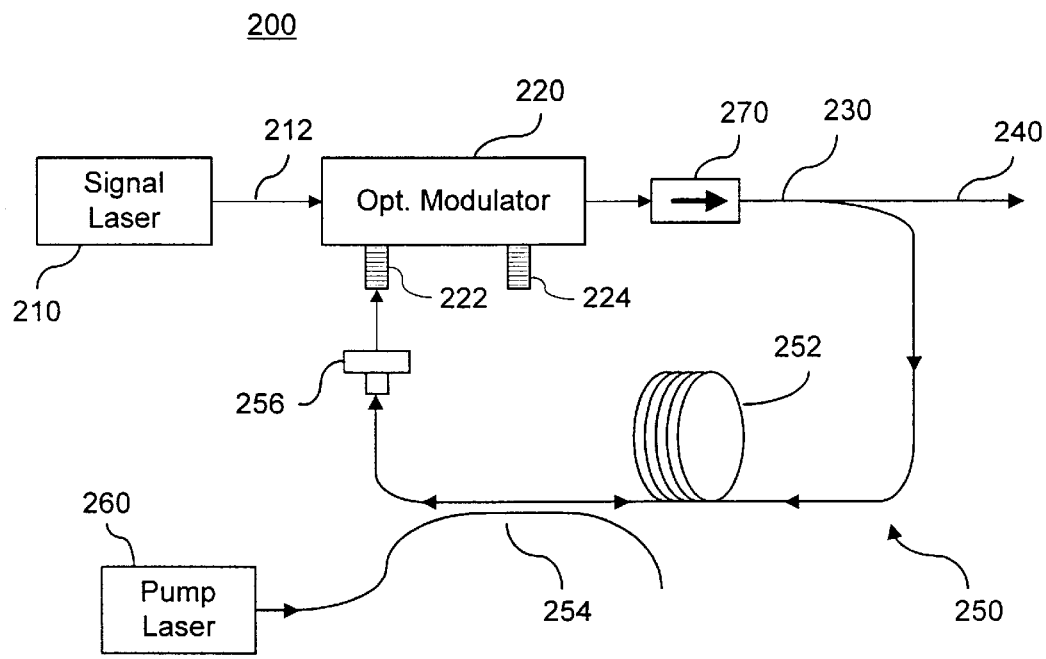
FIG. 2 is a diagram showing one embodiment of a single-loop Brillouin OEO using a signal laser and a pump laser.

One embodiment 200 of the Brillouin OEO is shown in FIG. 2. The oscillator 200 includes a signal laser 210 which produces an optical carrier signal 212, an optical modulator 220 that modulates the carrier signal to produce information-bearing sidebands, and a Brillouin opto-electronic feedback loop 250. An optical coupler 230 is disposed at the output of the modulator 220 to split a portion of the optical output signal 240 to the Brillouin opto-electronic feedback loop 250.

The Brillouin opto-electronic feedback loop 250 comprises a Brillouin optical medium 252, a pump beam coupler 254, and a photodetector 256. A pump laser 260 is coupled to the loop 250 to provide a pump wave for producing the BSSA effect in the medium 252. The coupler 254 is configured so that the pump beam that is coupled into the loop 250 propagates in the opposite direction of the signal beam from the signal laser 210 and the modulator 220 and overlap with the signal beam within the optical medium 252.

In general, any laser may be used as the lasers 210 and 260, including but not limited to solid-state lasers, diode lasers, and diode-pumped solid-state lasers. Preferably, both lasers 210 and 260 operate in a continuous wave mode and the frequency difference between the lasers is stable. In general, any light sources that can produce monochromatic light at desired wavelengths may be used to replace the signal and pump lasers 210 and 260. For example, an incoherent light source such as a LED may be used; or a wide-spectral light source may be combined with a narrow band-pass filter to form the light source.

The medium 252 may be any optical medium having material properties to exhibit an electrorestrictive effect suitable for a Brillouin scattering process. A number of optical materials are known in the art for use in the Brillouin scattering, including materials in gaseous, aqueous and solid state phases. $CS_2$ and certain glasses are such examples. Optical waveguides and fibers may be the preferred optical media for optical communication and data processing applications. Other applications may use other suitable optical materials in implementation of the invention. Examples based on BSSA in optical fibers are used to illustrate the invention and should not be construed as limitations.

The delay in the feedback loop 250 is an important parameter of the Brillouin OEO since this delay determines the mode spacing of the oscillation in the feedback loop 250. The delay may be effected by optical delay, electrical delay or a combination of both. Optical delay can be implemented by simply using a delay caused by the optical medium 252 or adding an extra optical delay element. For a fiber loop, the delay may be adjusted by using a fiber stretcher to change the fiber length. Electrical delay can be implemented by an RF delay element (e.g., an RF in-line stretcher) disposed at the output of the photodetector 256. The delay of the feedback loop 250 may be varied to change the oscillation frequency.

The optical modulator 220 may be any modulator capable of imposing an RF modulation on the optical carrier signal by either phase modulation or amplitude modulation (e.g., a Mach-Zehnder modulator). Preferably, an electro-optic modulator may be used, such as a $LiNbO_3$ modulator. An RF port 222 in the modulator 220 receives the output electrical modulation signal from the photodetector 256. The modulator 220 also has an output port 224 for exporting RF signals.

It is desirable to reduce or minimize optical reflections other than the BSSA backscattering in the photonic system 200. This may be achieved by using anti-reflection interfacing devices such as fiber-to-fiber and fiber-to-air interface angle polished connectors. A interface connector with index-matched gel may also be used. Furthermore, an optical isolator 270 can be used to reduce or minimize the amount of light from entering the modulator 220 and the signal laser 210.

Figure 3:
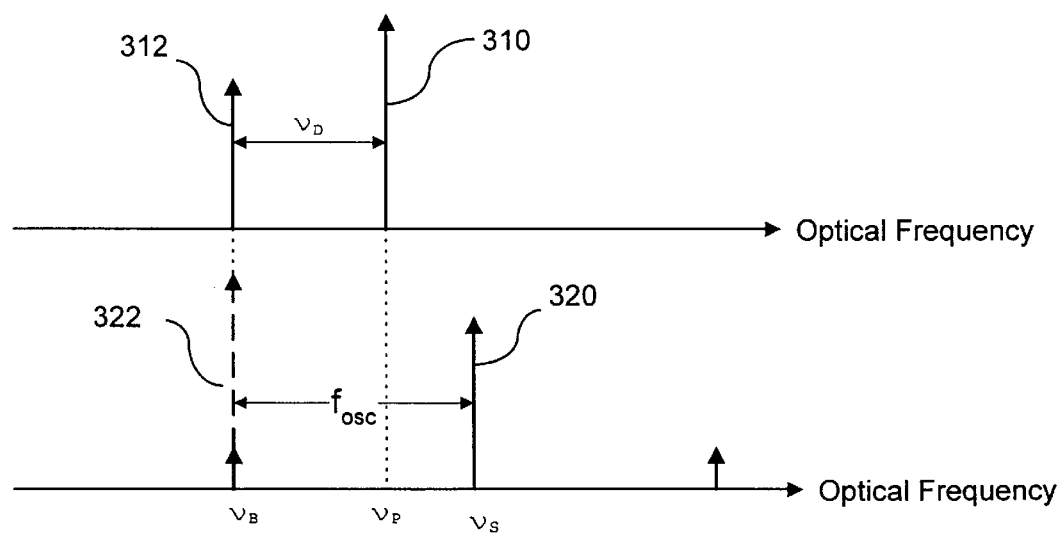
FIG. 3 is a spectrum diagram showing frequency relation of the optical signals in the Brillouin OEO of FIG. 2.

In operation, the pump beam from the pump laser 260 is fed into the fiber loop 252 and interacts with the fiber 252 and the signal beam to provide the Brillouin amplification. The pump beam induces a moving acoustic grating via the electrorestrictive effect in the fiber 252 which scatters the pump beam into the direction of the signal beam to produce a Brillouin signal. Due to the Doppler effect associated with the moving grating, the frequency $v_B$ of the Brillouin signal will be shifted below the pump frequency $v_p$ by $v_D$. This is illustrated in FIG. 3 where signal 310 represents the pump beam at $v_p$ and signal 312 represents the Brillouin signal at $v_B$.

The oscillation in the Brillouin OEO 200 can initially built up from the noise. The white noise from the photodetector 256 in the feedback loop 250, such as the thermal noise, the shot noise, and relative-intensity noise, can excite the modulator 220 and generate modulation sidebands, which are also white noise, at the output 240 of the modulator 220. However, due to the narrow bandwidth of the Brillouin gain (~10 MHZ), only the frequency component that coincides with the frequency $v_B$ of the Brillouin signal will be amplified by the Brillouin selective sideband amplification effected by the pump beam form the pump laser 260. This is shown in FIG. 3 wherein signal 320 represents the signal carrier at the frequency of the signal laser 210, $v_s$, and signal 322 represents a sideband initiated by the noise at the frequency $v_B$ of the Brillouin signal. The sideband 322 is amplified by acquiring energy from the pump beam 310 at $v_p$ through the Brillouin scattering beam 312 at $v_B$ when the Brillouin scattering beam 312 and the sideband 322 overlap each other in the frequency domain.

The beating between the amplified sideband 322 at $v_B$ and the carrier frequency $v_s$ of the signal laser 210 results in a beat signal with an oscillating frequency of $f_{osc}=|v_B-v_s|$ at the output of the detector 256. This beat signal in turn drives the modulator 220 to produce a stronger sideband at the beat frequency $f_{osc}$ on the carrier beam at $v_s$. This forms a positive feedback since the output signal 240 and the feedback signal to the modulator 220 is in phase with respect to each other. In order to sustain an oscillation in the feedback loop 250, the open loop gain, i.e., the ratio of the RF output power from the photodetector 256 and the RF input power to the modulator 220 must be larger than unity. Therefore, the beat signal at $f_{osc}$ will continue to increase until the Brillouin gain in the feedback loop 250 saturates. At this point, the oscillation power is thus clamped at a level corresponding to a unit gain in the loop 250.

Figure 4A:
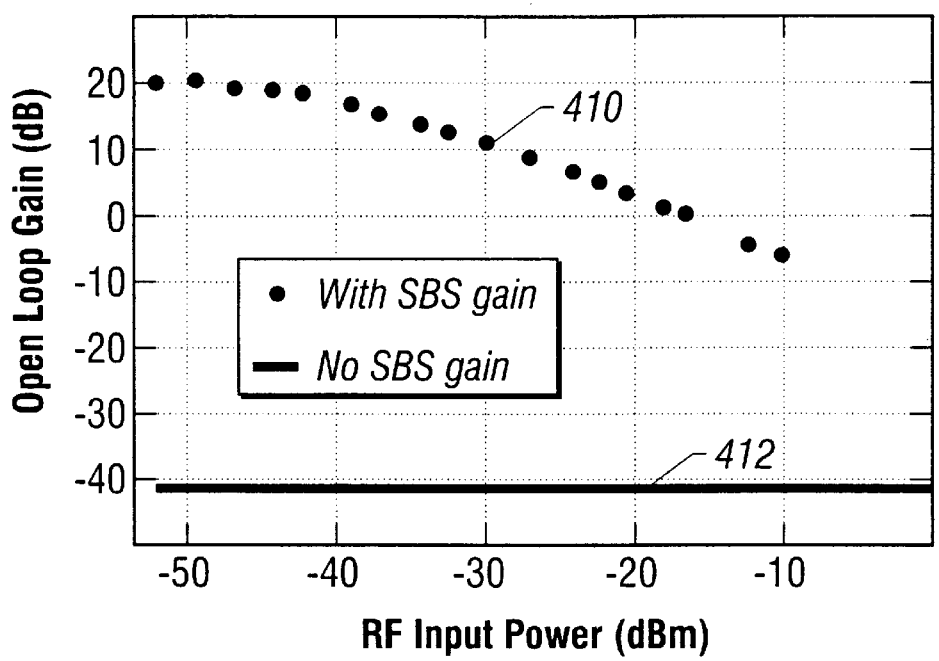
FIG. 4A is a chart of measured open loop gain of the system of FIG. 2.

FIG. 4A shows a chart of the open loop gain of the Brillouin OEO 200 as a function of the RF input power to the modulator 220. The measurements were performed with a silica fiber of 12.8 Km and a pump power of about 12.23 mW from the pump laser 260 at 1.3 $\mu$m. Trace 410 formed by the solid dots represents the measured Brillouin open loop gain which was about 20 dB for an optical power of about 2.61 mW at the photodetector 256. The Brillouin open loop gain decreases at high input RF power levels. Curve 412 is the gain when the pump laser 260 was turned off. It is evident from the data that a small signal gain of more than 20 dB at 5.5 GHz is achieved, more than sufficient for the OEO to start oscillation. In comparison, the open loop gain without Brillouin selective sideband amplification is about −41 dB, which is actually a loss. An increase of 61 dB in the signal amplification is achieved by using the Brillouin selective sideband amplification. This indicates the high efficiency of the Brillouin selective sideband amplification process.

Figure 4B:
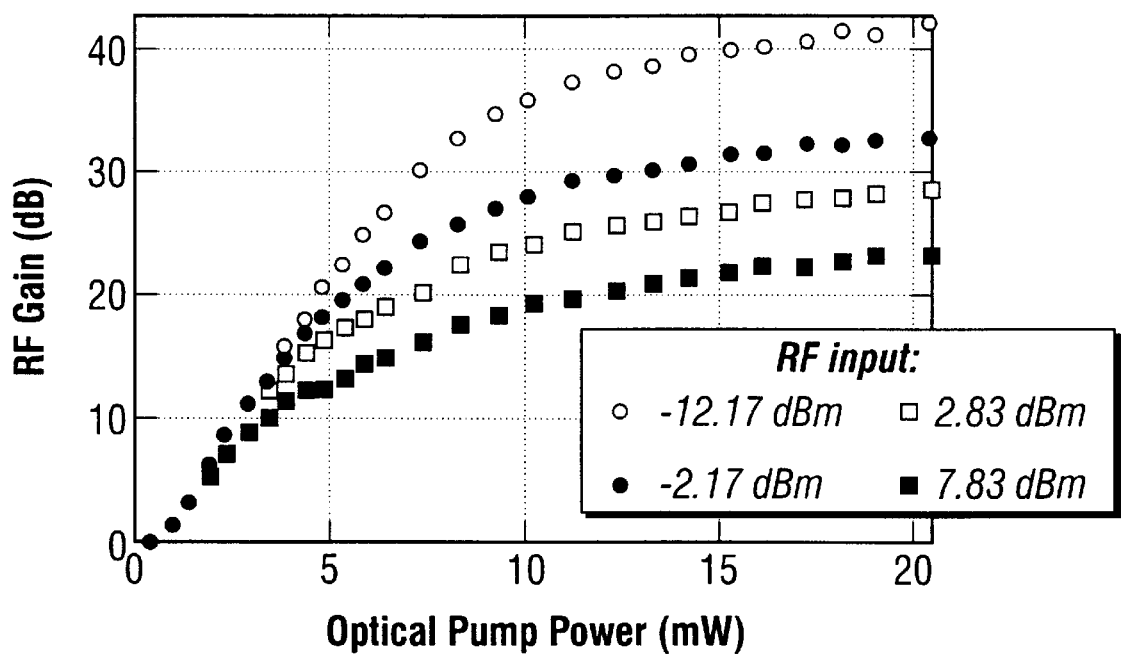
FIG. 4B is a chart of measured RF gain of the system of FIG. 2.

FIG. 4B further shows the measured RF gain of the RF signals as a function of the pump power from the pump laser 260 under various RF input power levels. The RF gain is defined as the ratio between the received RF powers with and without the Brillouin selective sideband amplification. A substantial RF gain was achieved even when the pump power is lower than the SBS threshold level of about 10 mW. The RF gain saturates at high optical pump powers. This gain saturation is beneficial since it suppresses the noise of the spontaneous Brillouin scattering that is commonly found in digital Brillouin amplification systems.

The Brillouin OEO 200 can achieve a single-mode oscillation without an electrical bandpass filter. The bandwidth of the Brillouin selective sideband amplification is narrow and about 10 MHZ in fibers. As a result, the Brillouin selective sideband amplification in the feedback loop 250 automatically implements bandpass filtering. Such signal filtering is further enhanced by the strong gain competition characteristics of the Brillouin selective sideband amplification. Thus, to this end, the Brillouin amplifier functions like a narrow bandpass filter with a gain.

Since $f_{osc}=|v_B-v_s|=|v_P-v_s-v_D|$, a change in the frequency difference, $(v_p-v_s)$, can change the center frequency of the Brillouin OEO 200. Therefore, the oscillating frequency can be tuned easily and quickly by tuning the frequency of the pump laser 210 or the signal laser 260. This makes the Brillouin OEO 200 a widely tunable signal source.

The Brillouin selective sideband amplification process can be much more efficient than many other optical amplification schemes because all Brillouin scattering energy from the pump laser 260 is transferred into the desired weak sideband 322. Since the strong carrier 320 is not amplified, the saturation of the receiving photodetector 256 can also be avoided.

In addition, Brillouin amplification is used to provide a sufficient gain for the OEO to start and sustain an electro-optic oscillation. This essentially eliminates the need for a high-frequency electrical amplifier which is usually bulky, expensive, and power-consuming. Such a replacement also eliminates the flicker noise (i.e., 1/f noise) associated with high frequency electrical amplifiers and reduces the phase noise.

Both amplitude and phase modulators can be used in the Brillouin OEO. Preferably, a phase modulator is used to avoid the presence of the electrical bias that is often required in an amplitude optical modulator. Thus, the adverse bias drift associated with the amplitude modulator is automatically removed. Use of a phase modulator usually requires an additional device to convert a phase modulation into an amplitude modulation. The Brillouin OEO using a phase modulator, however, can efficiently convert a phase-modulated signal into an amplitude-modulated signal without other converting device or processing steps. The Brillouin selective sideband amplification can automatically effect a phase-to-amplitude conversion mechanism by providing a selective sideband amplification to break up the perfect amplitude balance of sidebands in a phase modulation. Such converted amplitude modulation can be highly stable and insensitive to the fluctuations in the carrier frequency of the signal laser, the temperature, and the fiber length. In addition, the conversion is highly efficient due to the Brillouin gain obtained by the sidebands. See, U.S. patent application Ser. No. 09/006,845 filed on Jan. 14, 1998 by Yao, supra. Thus, in the Brillouin OEO 200 of FIG. 2, the RF modulation signal generated by the photodetector 256 is amplitude-modulated even though the modulator 220 is a phase modulator.

Although optical couplers 230 and 254 are described to couple optical energy from one fiber to another, other optical elements may also be used to perform the same function. For example, an optical circulator may be used to replace an optical coupler to reduce the coupling loss.

Figure 5A:
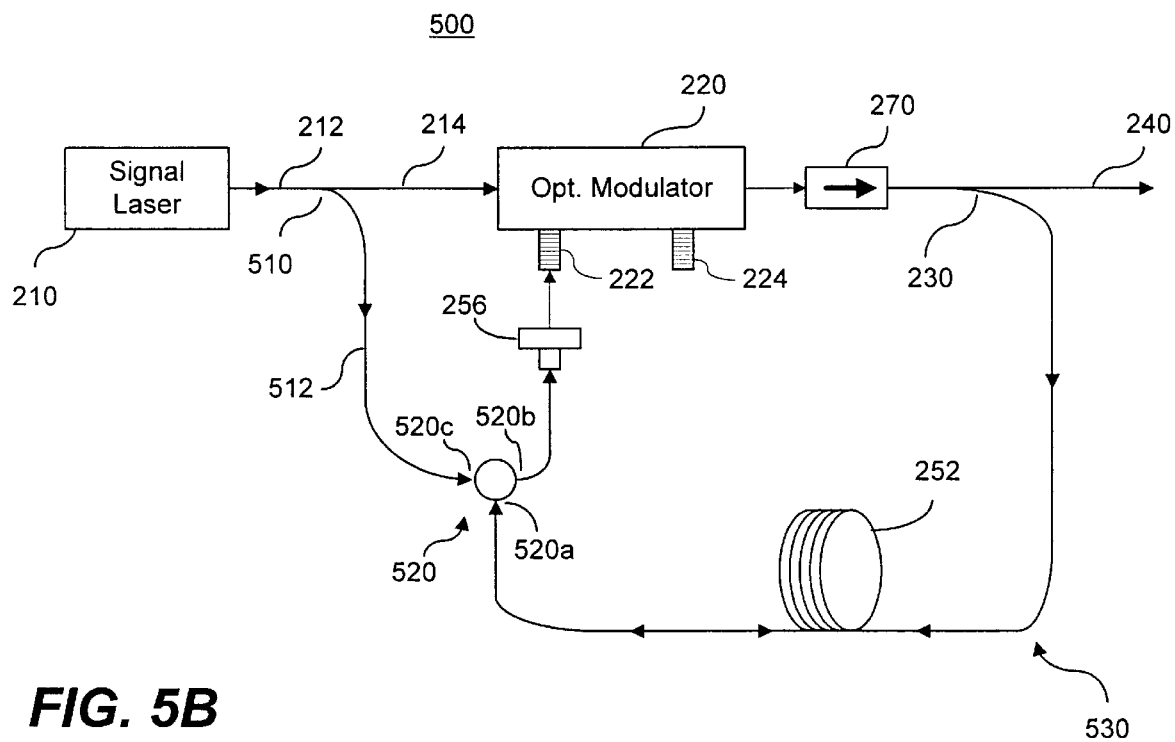
FIG. 5A is a diagram showing another embodiment of the Brillouin OEO using a single laser.

FIG. 5A shows another embodiment 500 of the Brillouin OEO of the invention in which a single laser 210 serves both as a signal laser and as a pump laser. The output beam 212 is split by using a beam coupler 510 into a pump beam and a signal carrier beam 214. The pump beam is routed to an optical circulator 520 by an optical guiding element 512 such as a fiber. The signal carrier beam 214 is routed to an optical modulator 220 and is coupled to an opto-electronic loop 530 by a coupler 230 disposed at the output of the modulator 220.

The feedback loop 530 includes a Brillouin optical medium 252 which may be a delay fiber line as shown in FIG. 5A, the optical circulator 520 for coupling the pump beam to the medium 252 and routing the Brillouin and carrier signals, and a photodetector 256 that interconnects the feedback loop 530 to the optical modulator 220 through an RF port 222.

The optical circulator 520 has three terminals 520a, 520b, and 520c to route light from 520a to 520b and from 520c to 520a in a circular manner. Thus, the pump beam is coupled from the terminal 520c to the terminal 520a into the loop 500 and propagates in the opposite direction of the signal carrier signal. The Brillouin signal generated by the pump beam in the medium 252 and the co-propagating signal carrier signal are routed from the terminal 520a to the terminal 520b to reach the photodetector 256.

The photodetector 256 receives the Brillouin signal and the signal carrier signal and produces an electrical modulation signal which is the beat between the Brillouin signal and the signal carrier signal. The pump laser beam in the guiding element 512 should be sufficiently strong so that the open loop gain of the loop 530 is larger than unity.

Other elements may be added to the Brillouin OEO 500. For example, in addition to the RF output at the port 224 in the modulator 220, a RF coupler may be inserted between the photodetector 256 and the input RF port 222 for injecting or exporting an RF signal. Also, optical isolators (e.g., 270) may be used to minimize any adverse optical feedback.

Figure 5B:
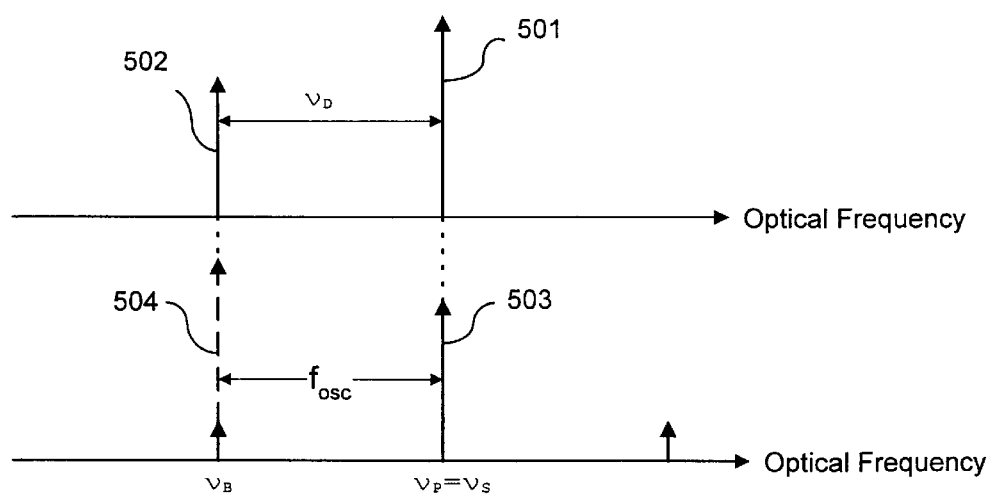
FIG. 5B is a spectrum diagram showing the frequency relation of the optical signals in the system of FIG. 5A.

The oscillation frequency of the Brillouin OEO 500 is essentially equal to the Brillouin Stokes frequency shift $v_D$ caused by the Doppler effect. This is illustrated in FIG. 5B in which the pump 501 and carrier signal 503 are at the same frequency. For silica fibers pumped at 1.3 μm, the oscillation frequency is about 12.8 GHz. Since the same laser 210 is used both as the signal 503 and the pump 501 and therefore there is no need to lock the frequencies of the pump beam and the signal beam for stability.

Figure 6A:
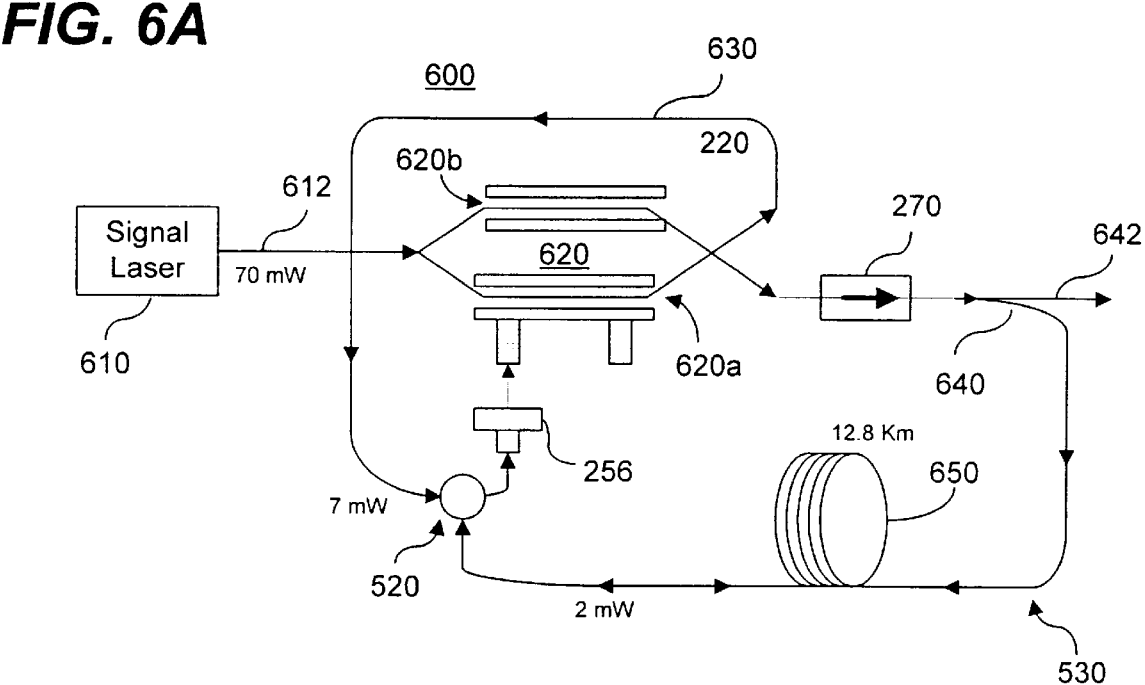
FIG. 6A is a diagram showing one implementation of the system in FIG. 5A using an amplitude modulator and an optical fiber loop.

The Brillouin OEO 500 was demonstrated by using a Brillouin OEO 600 shown in FIG. 6A. A diode-pumped YAG laser 610 was used to produce an output power of about 70 mW at 1.32 μm. A Mach-Zehnder modulator 620 is used to conveniently splitting the laser beam from the laser 610 into a pump beam and a signal carrier beam by respectively passing the pump beam through an unmodulated arm 622a and passing the signal carrier beam through a phase modulated arm 622b. A fiber loop 630 is used to guide the unmodulated pump beam to the optical circulator 520. The modulated signal carrier beam from the arm 622b is directed to the opto-electronic loop 530 which has a spool of silica fiber 650 of about 12.8 Km as the Brillouin medium and the optical delay element.

The Mach-Zehnder modulator 620 has a 3-dB bandwidth of 5 GHz. The photodetector 256 used in the test has a 3-dB bandwidth of 18 GHz and a saturation power of about 5 mW. The optical power going into the detector 256 without Brillouin amplification is about 1.6 mW and the optical pump power into the optical circulator 520 is 7 mW. The circulator 554 has an insertion loss of 1 dB. In addition, a HP 8563E spectrum analyzer is used to observe the opto-electronic oscillation.

Figure 6B:
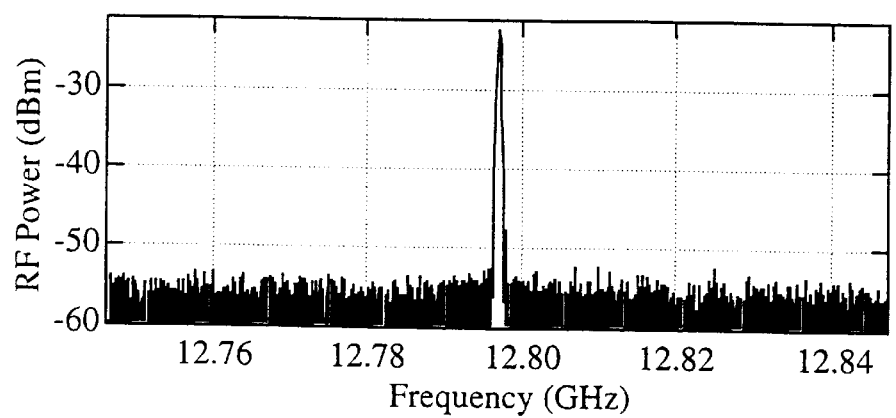
FIG. 6B is a chart showing an observed RF oscillation spectrum using the system of FIG. 6A.

FIG. 6B shows the recorded oscillation spectrum. The measured signal level is about −21 dBm. Taking into account of an electrode loss of about 10 dB in the modulator 620, the oscillation power at the output of the photodetector 256 is about −11 dBm.

Another aspect of the Brillouin OEO is that the phase noise decreases with the loop delay time. Under certain conditions, the phase noise can decrease quadratically with the loop delay time. This is similar to the single-loop OEO described in the U.S. patent application Ser. No. 08/510,064, now U.S. Pat. No. 5,723,856. Also, the oscillator's phase noise is essentially independent of the oscillation frequency. This allows the generation of high frequency and low phase noise signals.

Multi-Loop Brillouin Opto-Electronic Oscillators

The Brillouin OEOs in FIGS. 2 and 5A may be modified to include at least one additional feedback loop with a different loop delay. This forms a multi-loop Brillouin OEO wherein at least one feedback loop operates based on the Brillouin selective sideband amplification. Each loop is configured to have a positive feedback. The phases of the feedback loops are preferably locked relative to each other in order to sustain a single-mode oscillation and to tune the frequency of the oscillation. An oscillating mode in such a multi-loop Brillouin OEO must be in resonance with permissible modes of all feedback loops, i.e., simultaneously overlapping with a mode of each and every feedback loop. Unlike the single-loop Brillouin OEOs described above, the open loop gain of each loop in a multi-loop Brillouin OEO can be less than unity and is still capable of sustaining the oscillation in each loop as long as the total open loop gain of the multiple loops is greater than unity.

Many aspects of the multi-loop Brillouin OEO of the present invention are similar to the non-Brillouin multi-loop OEOs disclosed in the U.S. patent application Ser. No. 08/693,798, now U.S. Pat. No. 5,777,778, which is incorporated herein by reference. For example, the feedback loop with the shortest delay generates the modes of widest mode spacing in the frequency domain and the feedback loop with the longest delay produces modes of smallest mode spacing. In a two-loop configuration, the short loop dictates the continuous tuning range in the present invention and the long loop determines the tuning resolution. Thus it is advantageous to have a short feedback loop to achieve a wide tuning range and to have a long feedback loop to obtain both a high tuning resolution. Furthermore, the phase noise of a multi-loop Brillouin OEO is dictated by the longer loop which has larger cavity quality factor or Q-factor, resulting in an oscillator having large mode spacing and low phase noise.

In the single-loop Brillouin OEO 500 to obtain the data in FIG. 6, the fiber is about 12.8 km which produces a mode spacing of less than 10 kHz. Since the Brillouin gain bandwidth is about 10 MHZ, mode hopping can occur. One solution is to add one or more feedback loops.

Figure 7A:
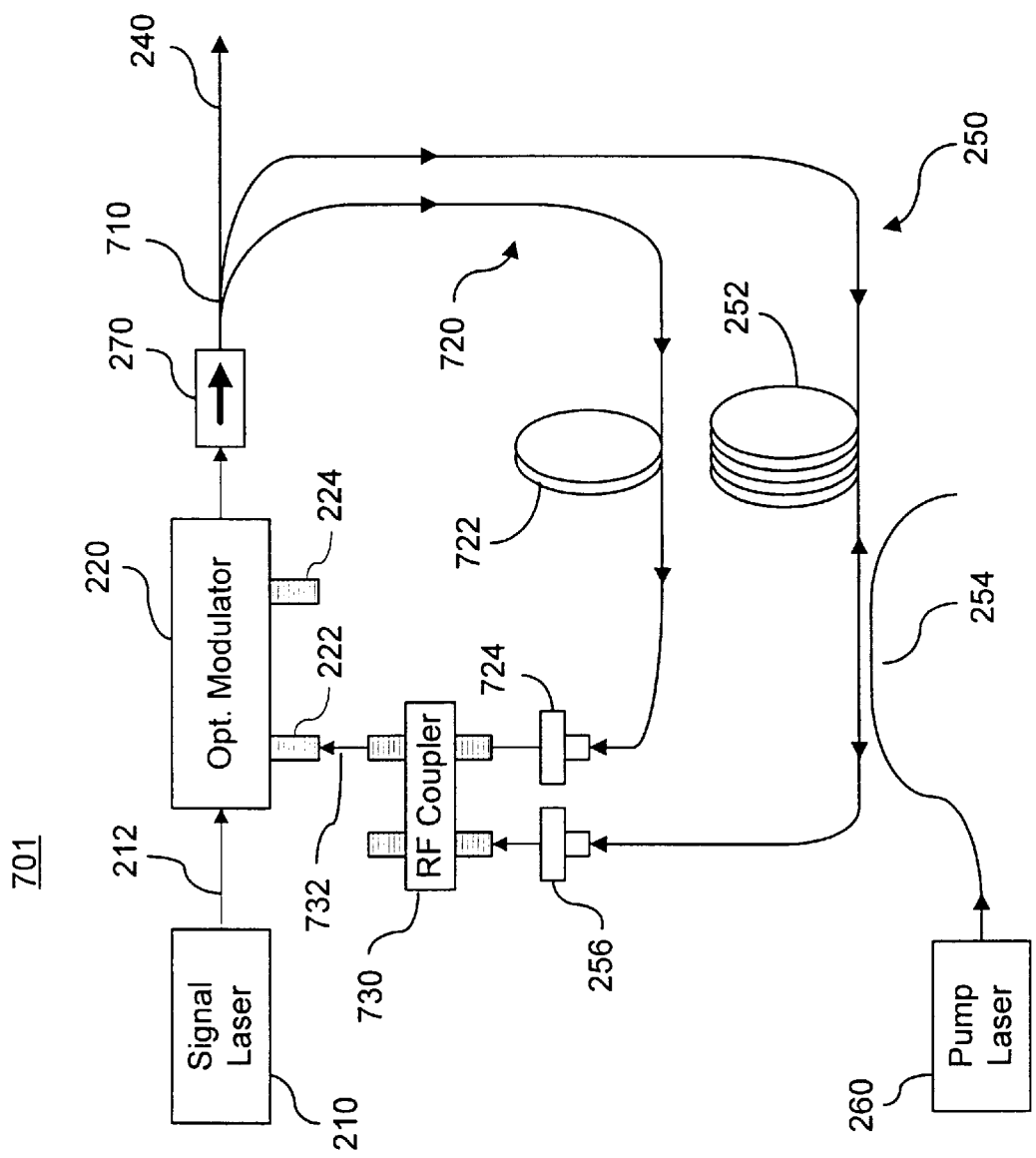
FIG. 7A is one embodiment of the multi-loop Brillouin OEO using a Brillouin loop and a non-Brillouin opto-electronic loop based on the two-laser configuration in FIG. 2.

FIG. 7A shows one embodiment 701 of the multi-loop Brillouin OEO based on the single-loop Brillouin OEO 200 of FIG. 2. A second active opto-electronic feedback loop 720 is added in parallel with respect to the Brillouin feedback loop 250. The phase delay of the second loop 720 is preferably different from the Brillouin loop 250. A fiber coupler 710 is disposed at the output of the optical modulator 220 to couple the output optical power into the feedback loops 250 and 720. The loop 720 includes an optical delay element 720 and a photodetector 724. The optical delay element 720 may be a fiber with a predetermined length or other optical delay elements. An RF coupler 730 receives and combines the electrical output signals from both photodetectors 256 and 724 to produce an electrical modulation signal 732.

In the Brillouin loop 250, the loop gain is provided by the pump laser 260. The loop 720 may also be a Brillouin loop similar to the loop 250 by implementing another pump beam and a fiber coupler to produce a respective backscattered Brillouin signal. Alternatively, the loop 720 can be a non-Brillouin opto-electronic feedback loop and an RF amplifier may be connected between the photodetector 724 and the RF coupler 730 to provide the necessary gain for sustaining oscillation therein.

A variable delay element may be inserted in the feedback loops 250 and 720 to adjust the delays to either achieving oscillation or tuning the oscillation frequency. For a fiber loop, a fiber stretcher may be used. A variable RF in-line stretcher may be inserted between the RF coupler and the photodetector 156 or 724 to change the loop delay.

Figure 7B:
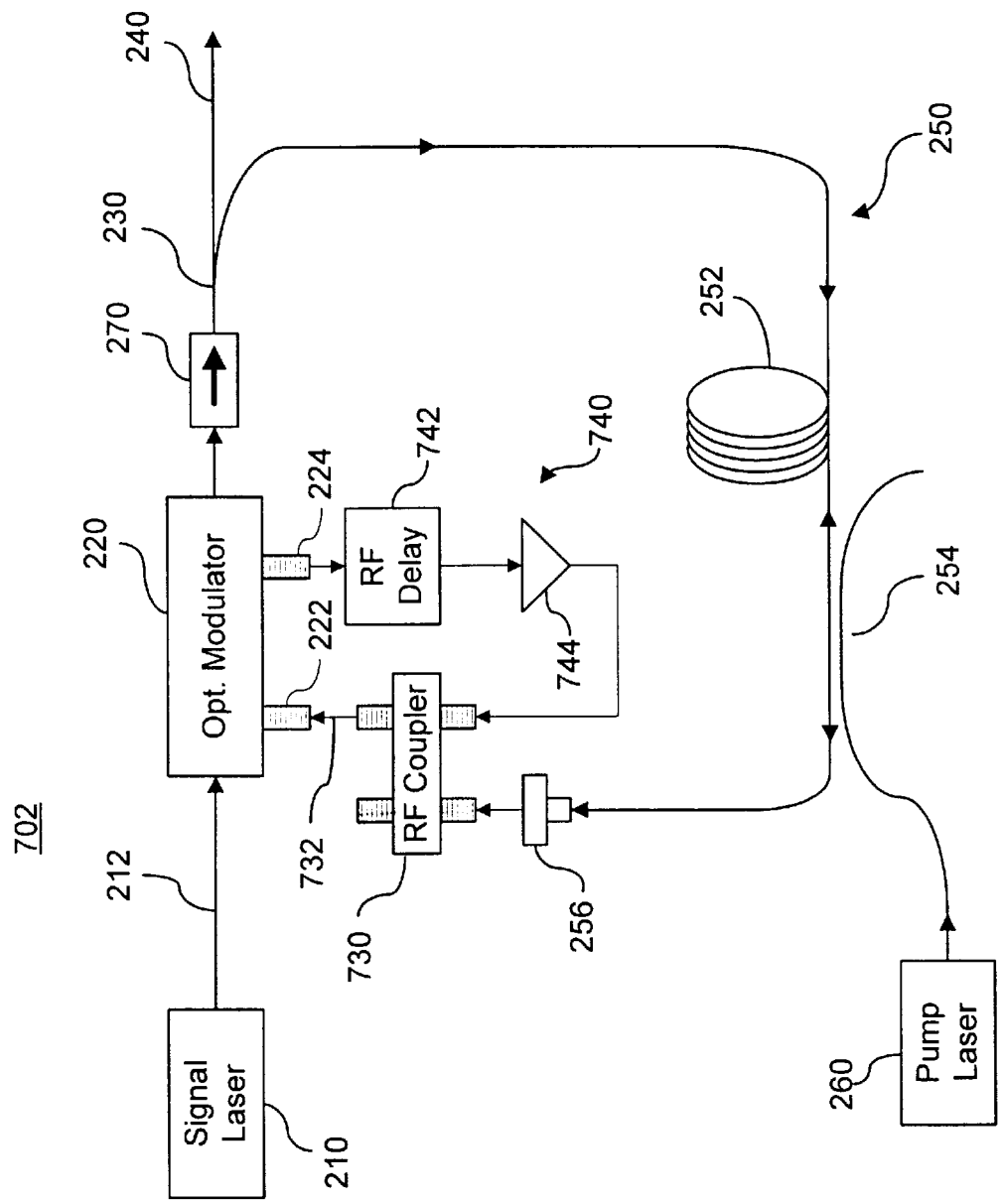
FIG. 7B is another embodiment of the multi-loop Brillouin OEO using a Brillouin loop and an electrical loop based on the two-laser configuration in FIG. 2.

FIG. 7B shows another multi-loop Brillouin OEO 702 by implementing at least one RF feedback loop 740 to the single-loop Brillouin OEO 200 of FIG. 2. An RF delay element 742 is connected to an RF output port 224 on the optical modulator 220. An RF amplifier 744 is used to provide the gain in the RF loop 740 so that the total open loop gain of both loops 250 and 720 is greater than unity. The delayed RF signal from the RF loop 740 is then combined with the RF signal from the Brillouin loop 250 at the RF coupler to produce an electrical modulation signal 732.

Figure 8A:
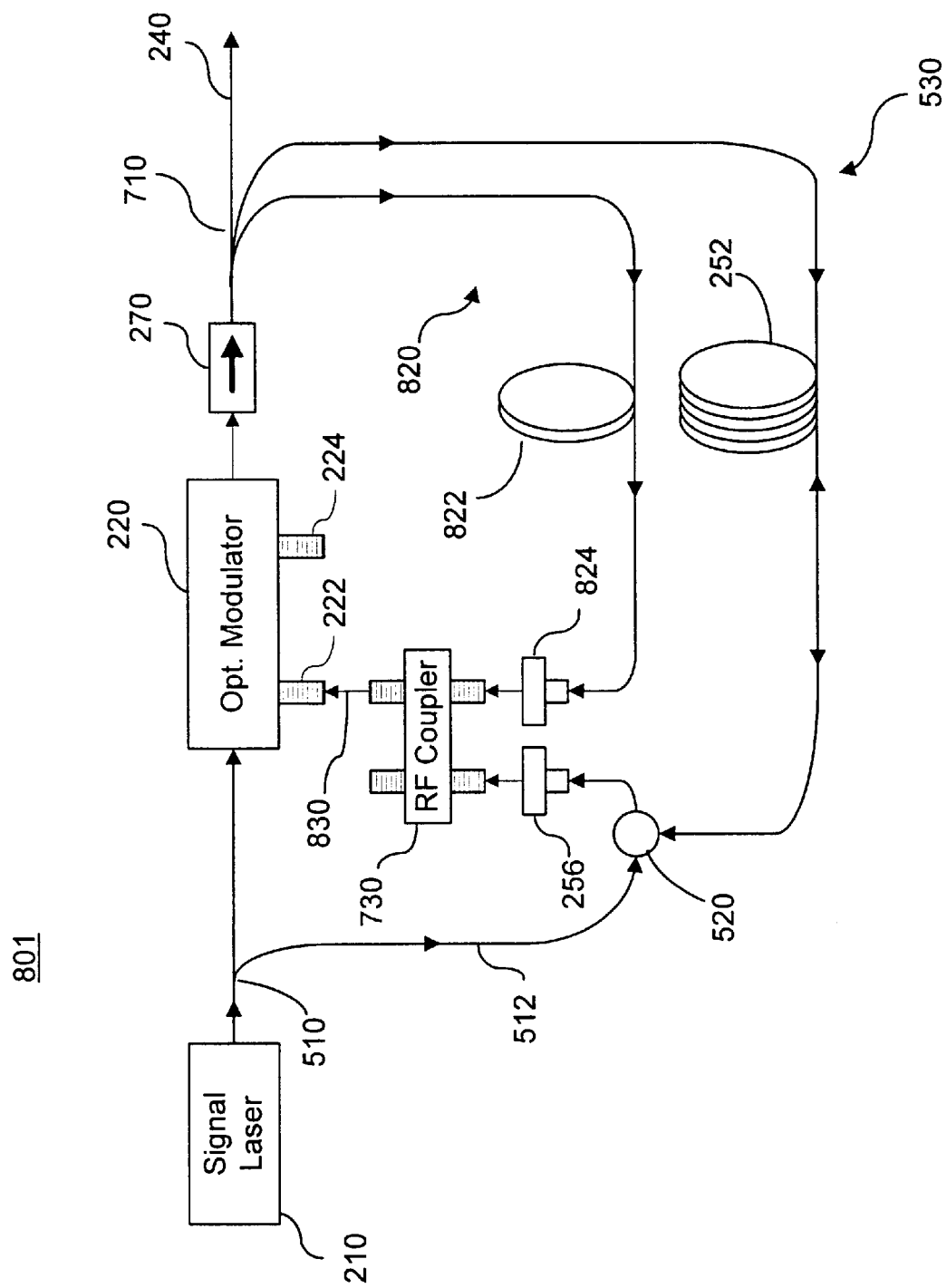
FIG. 8A is one embodiment of the multi-loop Brillouin OEO using a Brillouin loop and a non-Brillouin opto-electronic loop based on the single-laser configuration in FIG. 5A.
Figure 8B:
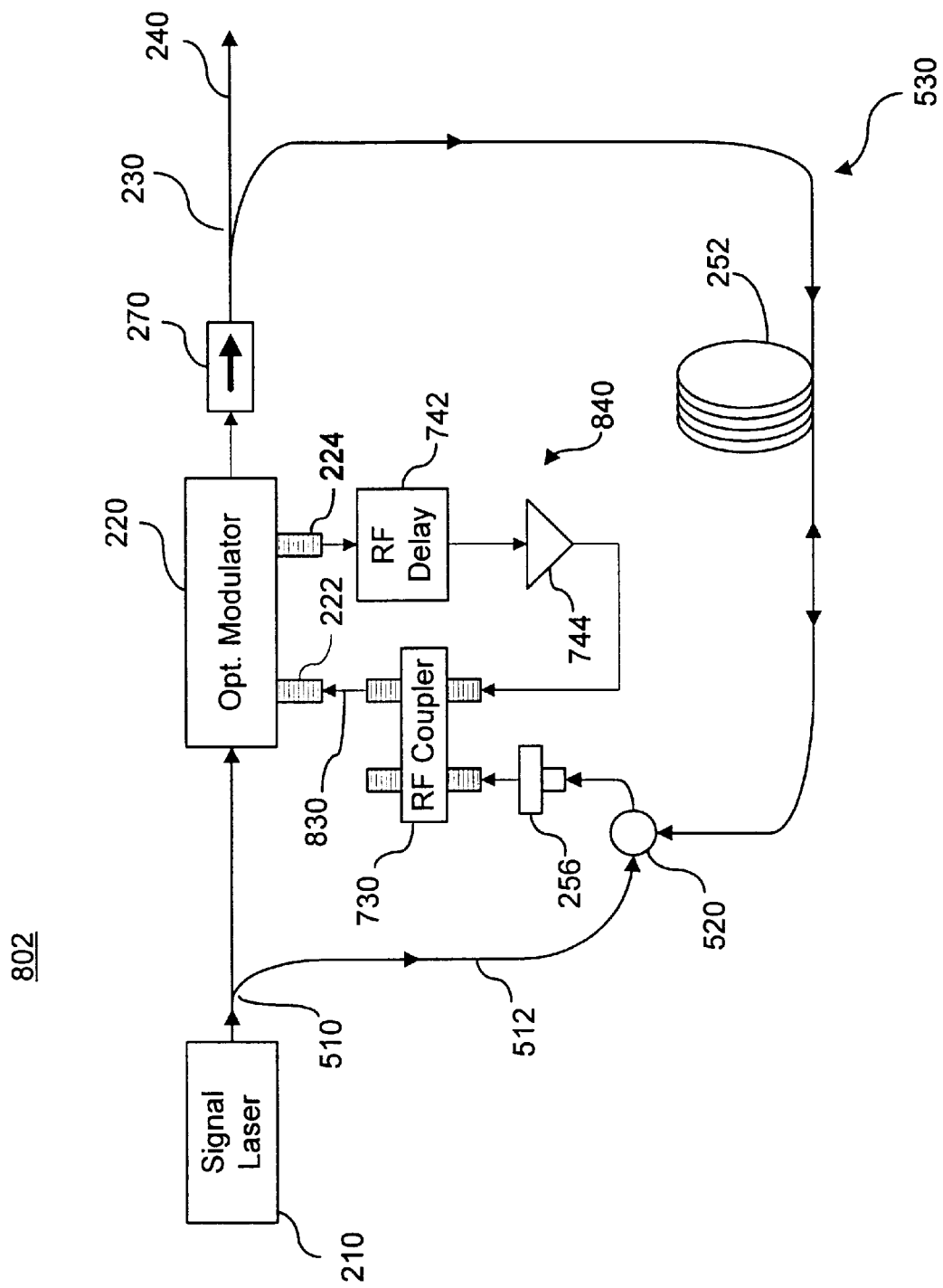
FIG. 8B is another embodiment of the multi-loop Brillouin OEO using a Brillouin loop and an electrical loop based on the single-laser configuration in FIG. 5A.

Multi-loop OEOs may also be formed based on the single-laser configuration 500 of FIG. 5A by adding one or more additional feedback loops. FIG. 8A shows one embodiment of a single-laser multi-loop OEO wherein a second loop 820 is a non-Brillouin loop similar to the loop 720 in the embodiment 701 of FIG. 7A. FIG. 8B shows another embodiment having a second RF feedback loop 840 similar to the loop 740 in the embodiment 702 of FIG. 7B.

Figure 8C:
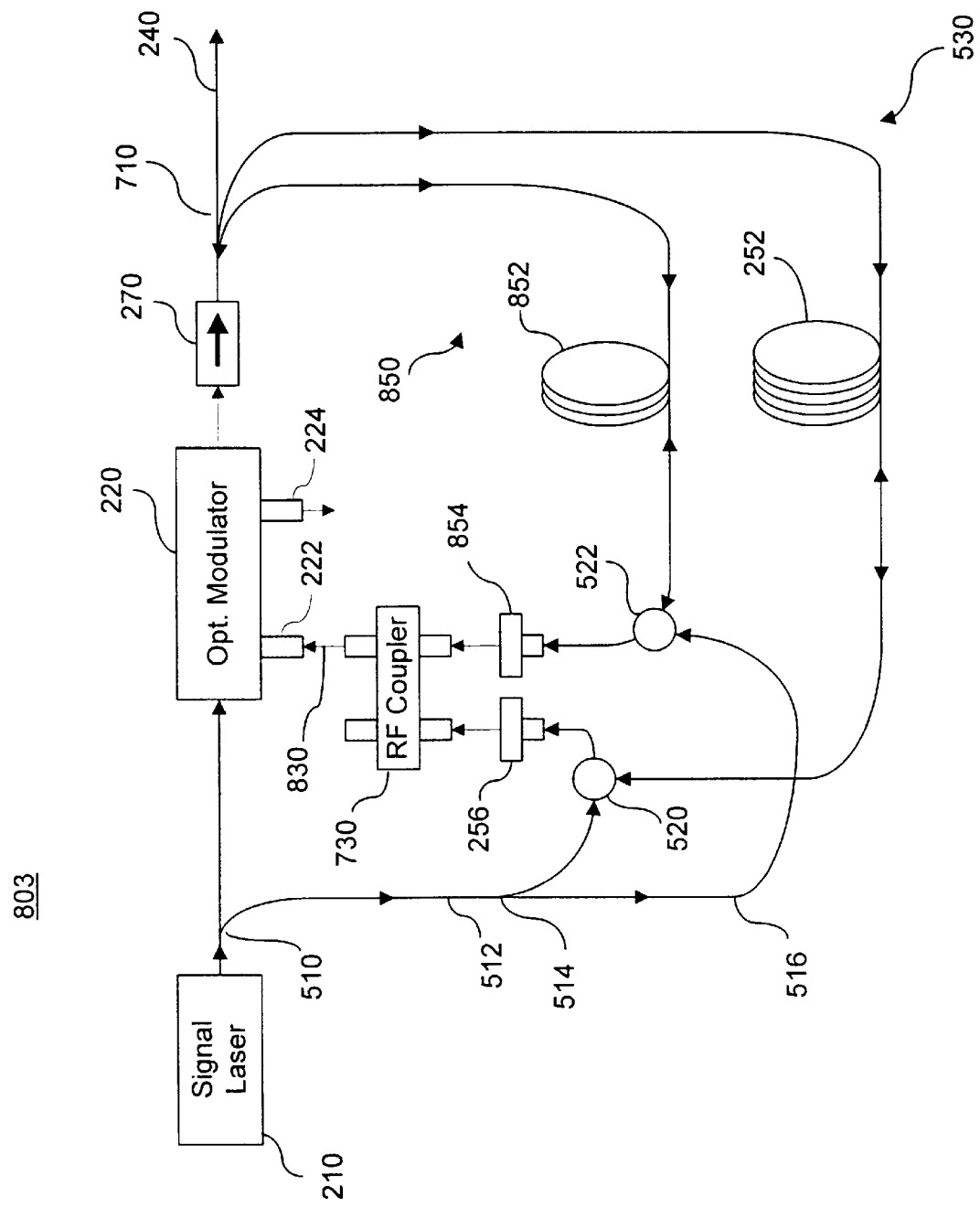
FIG. 8C is an multi-loop Brillouin OEO using two Brillouin loops based on the single-laser configuration in FIG. 5A.

A single-laser multi-loop OEO can be configured to have two Brillouin feedback loops. Referring to FIG. 8C, a second Brillouin loop 850 has an optical circulator 522 similar to 520. An additional optical coupler 514 is disposed in the beam guiding element 512 to couple a second pump beam to the circulator 522.

Although the present invention has been described in detail with reference to several specific embodiments, various modifications and enhancements may be made without departing from the scope and spirit of the invention.

For example, an electrical signal amplifier may inserted in one or more feedback loop to amplify the feedback electrical signal to the optical modulator. RF couplers and optical couplers may be deployed in a Brillouin OEO to extract or inject additional electrical or optical signals. In addition, an electronic bandpass filter (e.g., an RF filter) may be added to the electrical portion of a feedback loop to change the frequency composition of the feedback signal.

These and other variations and modifications are intended to be encompassed within the following claims.

What is claimed is:

1. An opto-electronic device, comprising:
    an electro-optical modulator having an electrical input port that accepts an electrical modulation signal and an optical output port and operating to generate at said optical output port an optical carrier signal which is modulated at an oscillation frequency related to said electrical modulation signal;

an opto-electronic loop connecting said optical output port and said electrical input port to receive at least a portion of said optical carrier signal and having an optical medium that produces a Brillouin scattering signal in a direction of said optical carrier signal in response to an optical pump signal which propagates in an opposite direction of said optical carrier signal; and a photodetector disposed to receive said Brillouin scattering signal and said optical carrier signal and configured to produce said electrical modulation signal, wherein said opto-electronic loop provides a positive feedback to effect an electromagnetic oscillation.

2. A device as in claim 1, wherein said optical pump signal is at a pump frequency relative to said optical carrier signal so that said Brillouin scattering signal overlaps with one modulation sideband in said optical carrier signal to amplify said modulation sideband.

3. A device as in claim 2, wherein said electrical modulation signal is a beat between said amplified modulation sideband and said optical carrier signal.

4. A device as in claim 2, wherein said oscillation frequency is approximately equal to a frequency difference between said optical carrier signal and said amplified modulation sideband.

5. A device as in claim 4, wherein a frequency difference between said optical pump signal and said optical carrier signal is adjustable, thereby effecting a frequency tuning mechanism for said oscillation frequency.

6. A device as in claim 1, wherein said electro-optical modulator is a phase modulator which is operable to produce a phase modulation on said optical carrier signal.

7. A device as in claim 6, wherein said opto-electronic loop is operable to effect a conversion from said phase modulation in said optical carrier signal to an amplitude modulation in said electrical modulation signal.

8. A device as in claim 1, wherein said electro-optical modulator is an amplitude modulator.

9. A device as in claim 1, wherein said opto-electronic loop is operable cause said electromagnetic oscillation to be in a single mode.

10. A device as in claim 1, further comprising an electrical signal coupler that is electrically connected between said electro-optical modulator and said photodetector.

11. A device as in claim 1, further comprising a light source disposed relative to said electro-optical modulator and configured to produce an optical carrier beam and said optical pump signal, wherein said optical carrier beam is modulated by said electro-optical modulator in response to said electrical modulation signal.

12. A device as in claim 11, wherein said light source comprises a monochromatic incoherent light source.

13. A device as in claim 11, wherein said light source comprises a laser.

14. A device as in claim 1, further comprising:

a signal light source disposed relative to said electro-optical modulator and said opto-electronic loop and operable to produce an optical carrier beam which is modulated by said electro-optical modulator in response to said electrical modulation signal; and a pump light source disposed relative to said opto-electronic loop and operable to produce said optical pump signal.

15. A device as in claim 14, wherein at least one of said light sources comprises a monochromatic incoherent light source.

16. A device as in claim 14, wherein at least one of said light sources comprises a laser.

17. A device as in claim 1, wherein said opto-electronic loop includes an optical fiber delay line.

18. A device as in claim 1, wherein said optical medium in said opto-electronic loop includes an optical fiber.

19. A device as in claim 1, wherein said opto-electronic loop is configured to have an open loop gain greater than unity.

20. An opto-electronic device, comprising:

a signal light source operable to produce an optical carrier beam at an optical carrier frequency;

an electro-optical modulator configured to have an electrical input port that accepts an electrical modulation signal and disposed relative to said signal light source to receive said optical carrier beam, said electro-optical modulator operating to produce a modulation at an oscillation frequency on said optical carrier beam to generate an optical carrier signal with a plurality of modulation sidebands;

an opto-electronic loop connected to receive at least a portion of said optical carrier signal and configured to have an optical medium that produces a Brillouin scattering signal in a direction of said optical carrier signal in response to an optical pump signal which propagates in an opposite direction of said optical carrier signal and a photodetector disposed relative to said optical medium to receive said Brillouin scattering signal and said optical carrier signal;

a pump light source disposed relative to said opto-electronic loop and configured to produce said optical pump signal, wherein said photodetector is configured to produce said electrical modulation signal and said opto-electronic loop provides a positive feedback to said electrical input port to effect an electromagnetic oscillation.

21. A device as in claim 20, wherein at least one of said light sources comprises a monochromatic incoherent light source.

22. A device as in claim 20, wherein at least one of said light sources comprises a laser.

23. A device as in claim 20, wherein said optical pump signal is at a pump frequency relative to said optical carrier signal so that said Brillouin scattering signal overlaps with one modulation sideband in said optical carrier signal to amplify said modulation sideband.

24. A device as in claim 23, wherein said electrical modulation signal is a beat between said amplified modulation sideband and said optical carrier signal.

25. A device as in claim 23, wherein said oscillation frequency is approximately equal to a frequency difference between said optical carrier signal and said amplified modulation sideband.

26. A device as in claim 25, wherein a frequency difference between said optical pump signal and said optical carrier signal is adjustable, thereby effecting a frequency tuning mechanism for said oscillation frequency.

27. A device as in claim 20, wherein said electro-optical modulator is a phase modulator which is operable to produce a phase modulation on said optical carrier signal.

28. A device as in claim 27, wherein said opto-electronic loop is operable to effect a conversion from said phase modulation in said optical carrier signal to an amplitude modulation in said electrical modulation signal.

29. A device as in claim 20, wherein said electro-optical modulator is an amplitude modulator.

30. A device as in claim 20, wherein said opto-electronic loop is operable to cause said electromagnetic oscillation to be in a single mode.

31. A device as in claim 20, wherein said opto-electronic loop includes an optical fiber delay line.

32. A device as in claim 20, wherein said optical medium in said opto-electronic loop includes an optical fiber.

33. A device as in claim 20, wherein said opto-electronic loop is configured to have an open loop gain greater than unity.

34. An opto-electronic device, comprising:
an electro-optical modulator having an electrical input port and an optical output port, operating to generate an optical signal produced by modulating an optical carrier beam at an oscillating frequency according to an electrical modulation signal from said electrical input port;
a first positive feedback loop disposed and configured to receive a first portion of said optical signal and to produce a first electrical feedback signal to said electrical input port; and
a second positive feedback loop disposed and configured to receive a second portion of said optical signal, said second positive feedback loop including:(1) an optical medium with a material property to produce a Brillouin scattering signal in a direction of said optical carrier signal in response to an optical pump signal in an opposite direction of said optical carrier signal; and (2)a photodetector disposed relative to said optical medium to receive both said Brillouin scattering signal and said optical carrier signal to produce a second electrical feedback signal to said electrical input port,
wherein said first electrical feedback signal and said second electrical feedback signal affect said electrical modulation signal and said first and second positive feedback loops effect an electromagnetic oscillation.

35. A device as in claim 34, wherein said first feedback loop and said second feedback loop have a combined open-loop gain greater than unity.

36. A device as in claim 35, wherein each of said first feedback loop and said second feedback loop has an open-loop gain less than unity.

37. A device as in claim 34, wherein said first and second feedback loops are configured to have at least one permissible oscillation loop mode that is common to both of said loops.

38. A device as in claim 34, wherein said optical pump signal is at a pump frequency relative to said optical carrier signal so that said Brillouin scattering signal overlaps with one modulation sideband in said optical carrier signal to amplify said modulation sideband.

39. A device as in claim 38, wherein said electrical modulation signal is a beat between said amplified modulation sideband and said optical carrier signal.

40. A device as in claim 38, wherein said oscillation frequency is approximately equal to a frequency difference between said optical carrier signal and said amplified modulation sideband.

41. A device as in claim 40, wherein a frequency difference between said optical pump signal and said optical carrier signal is adjustable, thereby effecting a frequency tuning mechanism for said oscillation frequency.

42. A device as in claim 34, wherein said electro-optical modulator is a phase modulator which is operable to produce a phase modulation on said optical carrier signal.

43. A device as in claim 42, wherein said first and second feedback loops are operable to effect a conversion from said phase modulation in said optical carrier signal to an amplitude modulation in said electrical modulation signal.

44. A device as in claim 34, wherein said electro-optical modulator is an amplitude modulator.

45. A device as in claim 34, wherein said first and second feedback loops are operable to cause said electromagnetic oscillation to be in a single mode.

46. A device as in claim 34, further comprising a light source disposed relative to said electro-optical modulator and configured to produce said optical carrier beam and said optical pump signal, wherein said optical carrier beam is modulated by said electro-optical modulator in response to said electrical modulation signal.

47. A device as in claim 46, wherein said light source comprises a monochromatic incoherent light source.

48. A device as in claim 46, wherein said light source comprises a laser.

49. A device as in claim 34, further comprising:
a signal light source disposed relative to said electro-optical modulator and operable to produce said optical carrier beam which is modulated by said electro-optical modulator in response to said electrical modulation signal; and
a pump light source disposed relative to said opto-electronic loop and operable to produce said optical pump signal.

50. A device as in claim 49, wherein at least one of said light sources comprises a monochromatic incoherent light source.

51. A device as in claim 49, wherein at least one of said light sources comprises a laser.

52. A device as in claim 34, wherein at least one of said first and second feedback loops includes an optical fiber delay line.

53. A device as in claim 34, wherein said optical medium includes an optical fiber.

54. A system as in claim 34, wherein a first amount of delay in said first feedback loop is substantially different than a second amount of delay in said second feedback loop.

55. A device as in claim 34, further comprising a variable optical delay element in at least one of said first and second feedback loops to introduce a variable amount of delay.

56. A system as in claim 34, further comprising a variable electrical signal delay device in at least one of said first and second feedback loops to introduce a variable amount of delay.

57. A system as in claim 34, wherein said first feedback loop further includes:
a second optical medium with a material property to produce a second Brillouin scattering signal in a direction of said optical carrier signal in response to a second optical pump signal in an opposite direction of said optical carrier signal; and
a second photodetector disposed relative to said second optical medium to receive both said second Brillouin scattering signal and said optical carrier signal to produce said electrical feedback signal.

58. An opto-electronic device, comprising:
an electro-optical modulator having an electrical input port and an optical output port, operating to generate an optical signal produced by modulating an optical carrier beam at an oscillating frequency according to an electrical modulation signal from said electrical input port;
an electrical feedback loop disposed and configured to receive a portion of said electrical modulation signal and to produce a first electrical feedback signal of a positive feedback to said electrical input port; and an opto-electronic feedback loop disposed and configured to receive a portion of said optical signal, said opto-electronic feedback loop including:(1) an optical medium with a material property to produce a Brillouin scattering signal in a direction of said optical carrier signal in response to an optical pump signal in an opposite direction of said optical carrier signal; and (2)a photodetector disposed relative to said optical medium to receive both said Brillouin scattering signal and said optical carrier signal to produce a second electrical feedback signal of a positive feedback to said electrical input port, wherein said first and second electrical feedback signals affect said electrical modulation signal and said electrical and opto-electronic feedback loops effect an electromagnetic oscillation.

59. A device as in claim 58, wherein said electrical and opto-electronic feedback loops have a combined open-loop gain greater than unity.

60. A device as in claim 59, wherein each of said electrical and opto-electronic feedback loops has an open-loop gain less than unity.

61. A device as in claim 58, wherein said electrical and opto-electronic feedback loops are configured to have at least one permissible oscillation loop mode that is common to both of said loops.

62. A device as in claim 58, wherein said optical pump signal is at a pump frequency relative to said optical carrier signal so that said Brillouin scattering signal overlaps with one modulation sideband in said optical carrier signal to amplify said modulation sideband.

63. A device as in claim 62, wherein said electrical modulation signal is a beat between said amplified modulation sideband and said optical carrier signal.

64. A device as in claim 62, wherein said oscillation frequency is approximately equal to a frequency difference between said optical carrier signal and said amplified modulation sideband.

65. A device as in claim 64, wherein a frequency difference between said optical pump signal and said optical carrier signal is adjustable, thereby effecting a frequency tuning mechanism for said oscillation frequency.

66. A device as in claim 58, wherein said electro-optical modulator is a phase modulator which is operable to produce a phase modulation on said optical carrier signal.

67. A device as in claim 66, wherein said first and second feedback loops are operable to effect a conversion from said phase modulation in said optical carrier signal to an amplitude modulation in said electrical modulation signal.

68. A device as in claim 58, wherein said electro-optical modulator is an amplitude modulator.

69. A device as in claim 58, wherein said first and second feedback loops are operable to cause said electromagnetic oscillation to be in a single mode.

70. A device as in claim 58, wherein said opto-electronic feedback loop includes an optical fiber delay line.

71. A device as in claim 58, wherein said optical medium includes an optical fiber.

72. A system as in claim 58, wherein a first amount of delay in said electrical feedback loop is substantially different than a second amount of delay in said opto-electronic feedback loop.

73. A device as in claim 58, further comprising a variable optical delay element in said opto-electronic feedback loop to introduce a variable amount of delay.

74. A system as in claim 58, further comprising a variable electrical signal delay device in said electrical feedback loop to introduce a variable amount of delay.

75. A method of generating an oscillatory signal, comprising:

modulating an optical carrier beam with an electrical modulation signal in an electro-optical modulator to produce an optical carrier signal with a plurality of modulation sidebands;

directing said optical carrier signal into an optical medium which is suitable for Brillouin scattering process;

producing a backscattered Brillouin signal in said optical medium by injecting an optical pump beam into said medium in the opposite direction of said optical carrier signal;

overlapping said Brillouin signal with one selected modulation sideband to amplify said selected modulation sideband;

converting a beat signal between said optical carrier signal and said amplified selected modulation sideband into a feedback electrical signal; and supplying said feedback electrical signal to the electro-optical modulator to affect said electrical modulation signal.

76. A method as in claim 75, further comprising:

producing a phase delay in said electrical feedback signal; and increasing said phase delay to reduce a phase noise.

77. An opto-electronic device, comprising:

an electro-optical modulator having an electrical input port that accepts an electrical modulation signal and an optical output port and operating to generate at said optical output port an optical carrier signal which is modulated at an oscillation frequency related to said electrical modulation signal;

an opto-electronic loop connecting said optical output port and said electrical input port to receive at least a portion of said optical carrier signal and having an optical medium that exhibits an electrorestrictive effect, wherein said opto-electronic loop produces a back-scattering signal in a direction of said optical carrier signal in response to an optical pump signal which is injected into said optical medium in an opposite direction of said optical carrier signal; and a photodetector disposed to receive said back-scattering signal and said optical carrier signal and configured to produce said electrical modulation signal, wherein said opto-electronic loop provides a positive feedback to effect an electromagnetic oscillation.

78. A device in claim 77, wherein said opto-electronic loop includes an electrical signal amplifier.

79. A device in claim 77, wherein said opto-electronic loop includes an electronic bandpass filter.

80. An opto-electronic device, comprising:

a signal light source operable to produce an optical carrier beam at an optical carrier frequency;

an electro-optical modulator configured to have an electrical input port that accepts an electrical modulation signal and disposed relative to said signal light source to receive said optical carrier beam, said electro-optical modulator operating to produce a modulation at an oscillation frequency on said optical carrier beam to generate an optical carrier signal with a plurality of modulation sidebands;

an opto-electronic loop connected to receive at least a portion of said optical carrier signal and configured to have an optical medium that exhibits an electrorestrictive effect to produce a back-scattering signal in a direction of said optical carrier signal in response to an optical pump signal in an opposite direction of said optical carrier signal and a photodetector disposed relative to said optical medium to receive said back-scattering signal and said optical carrier signal;

a pump light source disposed relative to said opto-electronic loop and configured to produce said optical pump signal, wherein said photodetector is configured to produce said electrical modulation signal and said opto-electronic loop provides a positive feedback to said electrical input port to effect an electromagnetic oscillation.

81. An opto-electronic device, comprising:

an electro-optical modulator having an electrical input port and an optical output port, operating to generate an optical signal produced by modulating an optical carrier beam at an oscillating frequency according to an electrical modulation signal from said electrical input port;

a first positive feedback loop disposed and configured to receive a first portion of said optical signal and to produce a first electrical feedback signal to said electrical input port; and a second positive feedback loop disposed and configured to receive a second portion of said optical signal, said second positive feedback loop including:(1) an optical medium exhibiting an electrorestrictive effect to produce a scattering signal in a direction of said optical carrier signal in response to an optical pump signal in an opposite direction of said optical carrier signal; and (2)a photodetector disposed relative to said optical medium to receive both said scattering signal and said optical carrier signal to produce a second electrical feedback signal to said electrical input port, wherein said first electrical feedback signal and said second electrical feedback signal affect said electrical modulation signal and said first and second positive feedback loops effect an electromagnetic oscillation.

82. An opto-electronic device, comprising:

an electro-optical modulator having an electrical input port and an optical output port, operating to generate an optical signal produced by modulating an optical carrier beam at an oscillating frequency according to an electrical modulation signal from said electrical input port;

an electrical feedback loop disposed and configured to receive a portion of said electrical modulation signal and to produce a first electrical feedback signal of a positive feedback to said electrical input port with a first amount of delay; and an opto-electronic feedback loop disposed and configured to receive a portion of said optical signal, said opto-electronic feedback loop including:(1) an optical medium exhibiting an electrorestrictive effect to produce a scattering signal in a direction of said optical carrier signal in response to an optical pump signal in an opposite direction of said optical carrier signal; and (2)a photodetector disposed relative to said optical medium to receive both said scattering signal and said optical carrier signal to produce a second electrical feedback signal of a positive feedback to said electrical input port with a second amount of delay, wherein said first and second electrical feedback signals affect said electrical modulation signal and said electrical and opto-electronic feedback loops effect an electromagnetic oscillation.

* * * * *